US012636918B2

(12) United States Patent
Scheifele et al.

(10) Patent No.: US 12,636,918 B2
(45) Date of Patent: *May 26, 2026

(54) TIRE ELECTRONICS ASSEMBLY

(71) Applicant: BRIDGESTONE AMERICAS TIRE OPERATIONS, LLC, Nashville, TN (US)

(72) Inventors: Kevin E. Scheifele, Atwater, OH (US); Hans R. Dorfi, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,257

(22) Filed: Aug. 19, 2024

(65) Prior Publication Data

US 2024/0408922 A1 Dec. 12, 2024

Related U.S. Application Data

(63) Continuation of application No. 17/631,880, filed as application No. PCT/US2020/043812 on Jul. 28, 2020, now Pat. No. 12,097,729.

(Continued)

(51) Int. Cl.
*B29D 30/00* (2006.01)
*B60C 23/04* (2006.01)

(52) U.S. Cl.
CPC ...... *B60C 23/0493* (2013.01); *B29D 30/0061* (2013.01); *B29D 2030/0077* (2013.01)

(58) Field of Classification Search
CPC . B60C 23/0493; B60C 2019/004; B60C 5/14; B29D 30/0061; B29D 2030/0077; B29D 2030/0072; G01N 17/00
(Continued)

(56) References Cited

U.S. PATENT DOCUMENTS

| | | | |
|---|---|---|---|
| 4,133,592 A | 1/1979 | Cobaugh | |
| 4,733,461 A | 3/1988 | Nakano | |

(Continued)

FOREIGN PATENT DOCUMENTS

| | | |
|---|---|---|
| CN | 104919653 A | 9/2015 |
| CN | 207106063 U | 3/2018 |

(Continued)

OTHER PUBLICATIONS

Jiaxiang, Wang et al., Introduction to Electronic Design Series, Identification and Selection of Components, Xidian University Press, Jul. 2014, http://www.xduph.com, 10 pp. with English translation.

*Primary Examiner* — Robert R Raevis

(57) ABSTRACT

An electronics assembly is provided for use with a tire. The assembly includes a plurality of printed circuit boards, each of which includes an electronic device configured to sense a condition of the tire. Attachment pegs are provided to attach the printed circuit boards together in stacked positions that are spaced apart by the attachment pegs. Each attachment peg has a lower end portion configured to attach to any one of the printed circuit boards. Each attachment peg further has an upper end portion configured to attach to any other one of the printed circuit boards. This enables the printed circuit boards to be attached interchangeably between the stacked positions.

15 Claims, 3 Drawing Sheets

Related U.S. Application Data

(60) Provisional application No. 62/882,801, filed on Aug. 5, 2019.

(58) Field of Classification Search
USPC ............ 374/141–144; 340/442–448, 426.33; 200/51.09, 51.1, 61.22–61.26, 402; 361/679.01, 735; 73/8, 9, 66, 462–467, 73/146–146.8, 756, 865.9, 866.5
See application file for complete search history.

(56) References Cited

U.S. PATENT DOCUMENTS

| | | | | |
|---|---|---|---|---|
| 5,018,982 | A * | 5/1991 | Speraw | H05K 7/142 |
| | | | | 439/74 |
| 6,317,330 | B1 * | 11/2001 | Portman | H05K 7/1461 |
| | | | | 439/74 |
| 8,963,676 | B1 * | 2/2015 | Hoang | H01F 27/2804 |
| | | | | 336/200 |
| 9,437,943 | B1 * | 9/2016 | Davis | H05K 1/144 |
| 2001/0031568 | A1 * | 10/2001 | Brekosky | H01R 12/7082 |
| | | | | 439/74 |
| 2005/0032398 | A1 * | 2/2005 | Perret | H05K 7/1452 |
| | | | | 439/67 |
| 2006/0173648 | A1 | 8/2006 | Chang | |
| 2006/0284309 | A1 * | 12/2006 | Park | H01L 23/49816 |
| | | | | 257/E25.023 |
| 2010/0176969 | A1 | 7/2010 | Buck | |
| 2011/0132649 | A1 | 6/2011 | Weston | |
| 2015/0064974 | A1 * | 3/2015 | Ozaki | H01R 12/523 |
| | | | | 439/626 |
| 2015/0122005 | A1 | 5/2015 | Nakatani | |
| 2016/0001615 | A1 | 1/2016 | Arai | |
| 2016/0214445 | A1 | 7/2016 | Sogabe | |
| 2017/0094792 | A1 | 3/2017 | Dunkel | |
| 2017/0244182 | A1 | 8/2017 | Müller | |
| 2018/0166776 | A1 * | 6/2018 | Ziegler | H01Q 1/52 |
| 2018/0186198 | A1 | 7/2018 | Zhou | |

FOREIGN PATENT DOCUMENTS

| | | |
|---|---|---|
| CN | 208012469 U | 10/2018 |
| EP | 1336511 A1 | 8/2003 |
| EP | 2863479 A1 | 4/2015 |
| EP | 2988109 A1 | 2/2016 |
| JP | S5260963 A | 5/1977 |
| JP | 2003237328 A | 8/2003 |
| JP | 2008261359 A | 10/2008 |
| JP | 2013187163 A | 9/2013 |
| JP | 2017124826 A | 7/2017 |
| KR | 20100088475 A | 8/2010 |
| KR | 20110023122 A | 3/2011 |
| KR | 101801923 B1 | 12/2017 |
| WO | 2017105842 A1 | 6/2017 |

* cited by examiner

TIRE ELECTRONICS ASSEMBLY

CROSS-REFERENCE TO RELATED APPLICATIONS

This application is a continuation of U.S. Nonprovisional patent application Ser. No. 17/631,880, filed on Jul. 28, 2020, which is a National stage entry under 35 U.S.C. § 371 of PCT Patent Application No. PCT/US2020/043812, which claims priority from U.S. Provisional Patent Application No. 62/882,801, filed on Aug. 5, 2019, each of which is incorporated by reference herein in its entirety.

FIELD OF THE INVENTION

This technology includes electronic devices for sensing conditions of a tire on a vehicle.

BACKGROUND

Electronic devices can be used to sense conditions of a tire on a vehicle. Such devices include air pressure and temperature sensors that are mounted inside the tire, and also include radio frequency transmitters for transmitting pressure and temperature signals from the tire to the vehicle.

SUMMARY

An electronics assembly is provided for use with a tire. In a given example, the assembly includes a plurality of printed circuit boards, each of which includes an electronic device configured to sense a condition of the tire. Attachment pegs are provided to attach the printed circuit boards together in stacked positions that are spaced apart by the attachment pegs. Each attachment peg has a lower end portion configured to attach to any one of the printed circuit boards. Each attachment peg further has an upper end portion configured to attach to any one of the printed circuit boards. This enables the printed circuit boards to be interchangeable between the stacked positions.

In an illustrated embodiment, each printed circuit board has an aperture and a peripheral slot with an open end. The lower end portion of each attachment peg is receivable through the open end of any one of the slots. The upper end portion of each attachment peg is receivable through any one of the apertures.

Each printed circuit board in the illustrated example has an upper side with an upper electrical contact and has a lower side with a lower electrical contact. The upper electrical contact on each one of the printed circuit boards is configured to electrically connect with the lower electrical contact on any other one of the printed circuit boards. This enables the printed circuit boards to be electrically connectable interchangeably between the stacked positions.

The apertures and slots in the printed circuit boards are arranged in circular arrays. The apertures on each printed circuit board are circumferentially offset from the slots on the same printed circuit board. The upper electrical connectors on each printed circuit board are circumferentially offset from the lower electrical connectors on the same printed circuit board. The offset between the electrical contacts ensures that the pegs, which reach axially between the apertures and the slots, will attach the printed circuit boards together in stacked positions in which the lower electrical contacts on an overlying PCB are aligned with the lower electrical contacts on an adjacent underlying the PCB.

The illustrated embodiment of the electronics assembly further includes a base configured for mechanical attachment to the tire. The base includes an attachment peg with an upper end portion configured to attach to any one of the printed circuit boards in a lowermost stacked position. This enables the printed circuit boards to be interchangeably attachable to the base in the lowermost stacked position.

DETAILED DESCRIPTION

Figures 1, 2:
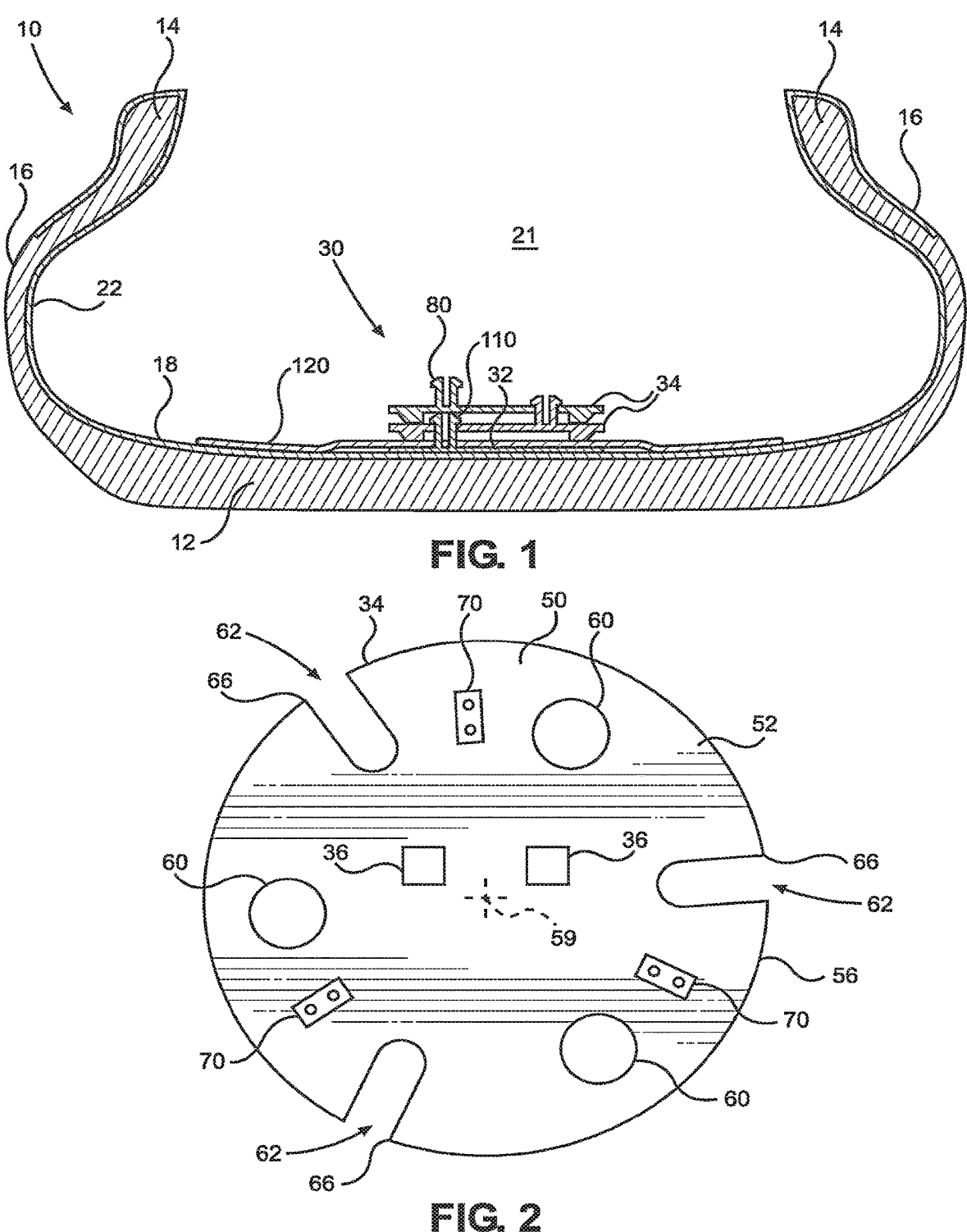
FIG. 1 is a schematic sectional view of a tire and an electronics assembly for use with the tire.
FIG. 2 is a top view of a part of the electronic assembly of FIG. 1.

The structures illustrated in the drawings include examples of the elements recited in the claims. The illustrated structures thus include examples of how a person of ordinary skill in the art can make and use the claimed invention. They are described here to provide enablement and best mode without imposing limitations that are not recited in the claims. One or more elements of one embodiment may be used in combination with, or as a substitute for, one or more elements of another embodiment as needed for any particular implementation of the invention.

As shown in FIG. 1, a pneumatic tire 10 includes a tread 12, bead portions 14, and sidewalls 16 interconnecting the tread 12 with the bead portions 14. An inner surface 18 of the tire 10 defines the periphery of a cavity 21 within the tire 10. The inner surface 18 in this example is provided by an innerliner 22 that reaches fully throughout the interior of the tread 12, the bead portions 14, and the sidewalls 16.

Also shown in FIG. 1 is an electronics assembly 30 for use with the tire 10. The electronics assembly 30 in this example includes a base 32 and multiple modules 34. The modules 34 are interconnected in a stacked arrangement above (radially inwardly of) the base 32.

Figures 3, 4, 5:
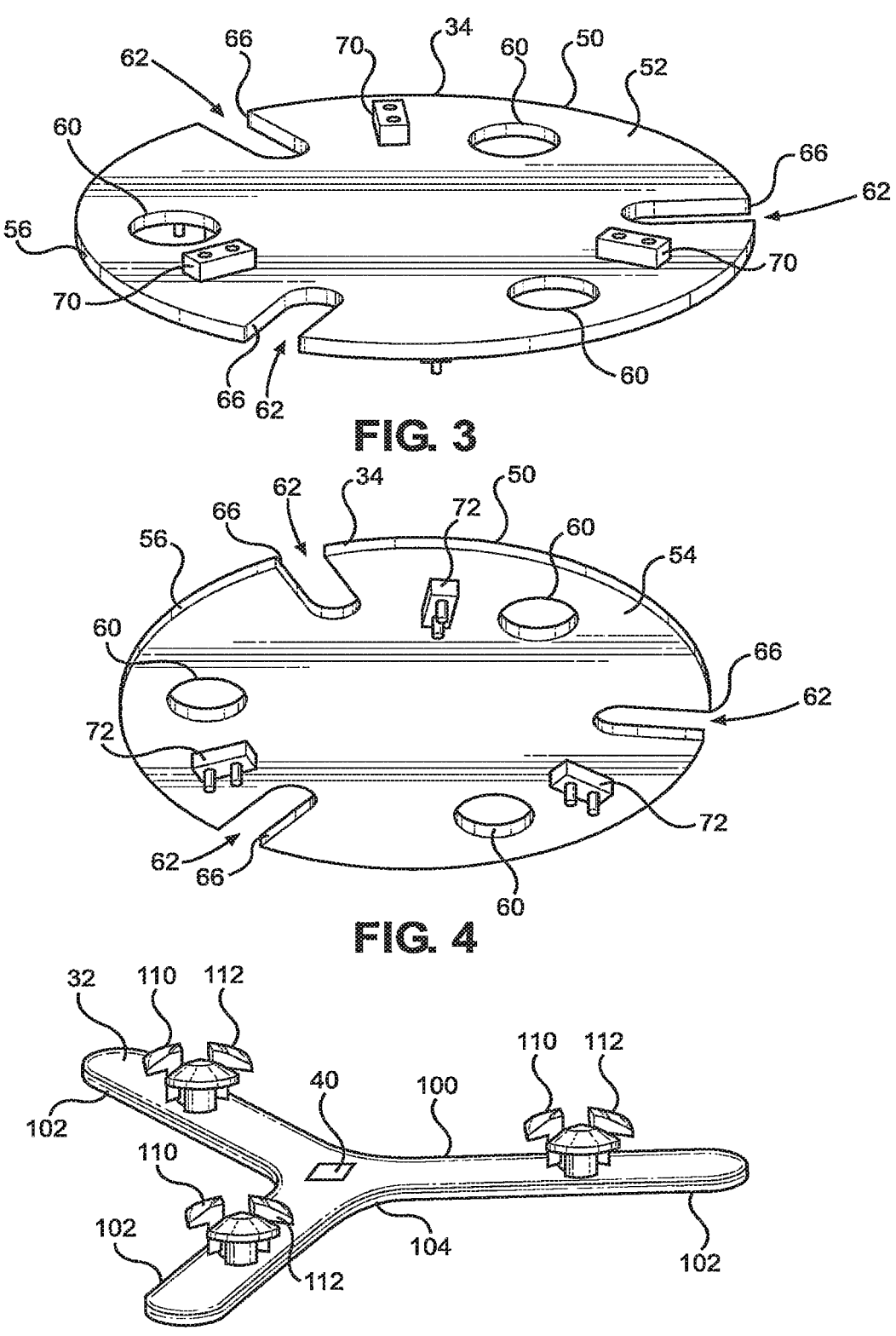
FIG. 3 is an upper perspective view of the part shown in FIG. 2.
FIG. 4 is a lower perspective view of the part shown in FIG. 2.
FIG. 5 is a perspective view of another the part shown in FIG. 1.

As shown schematically in FIGS. 2-4, each module 34 includes one or more electronic devices 36. The electronic devices 36 in the modules 34 may include air pressure sensors, temperature sensors, power generation or storage devices, radio frequency transmitters, radio frequency receivers, and/or any other electronic devices suitable for obtaining and/or providing information relating to conditions of the tire 10.

The base 32 also includes one or more electronic devices 40, as shown schematically in FIG. 5. These may include an electronic device 40 configured to provide a unique identification signal for identifying the tire 10 in distinction from another tire on the same vehicle or a different vehicle. Other electronic devices 40 in the base 32 may be configured to receive and/or transmit signals between the devices 40 in the base, the devices 36 in the modules 34, and the vehicle. In each case, the electronic devices 36 and 40 may be configured in any suitable manner known in the art.

Each module 34 in the illustrated example has the structural configuration shown in FIGS. 2-4. Each module 34 thus includes a printed circuit board (PCB) 50 including the respective electronic devices 36. The PCB 50 has an upper side 52 as shown in FIGS. 2-3, and a lower side 54 as shown in FIG. 4. A peripheral edge 56 of the PCB 50 has a circular shape centered on an axis 59.

The PCB 50 further has a number of circular apertures 60 and a corresponding number of slots 62. The apertures 60 are equally spaced apart circumferentially in a circular array centered on the axis 59. The slots 62 are likewise spaced apart in a circular array centered on the axis 59 and are circumferentially offset from the apertures 60. Each slot 62 has an open end 66 at the peripheral edge 56 and is oriented radially inward toward the axis 59.

A circular array of upper electrical connectors 70 are located on the upper side 52 (FIGS. 2-3) of the PCB 50. A corresponding circular array of lower electrical connectors 72 are located on the lower side 54 (FIG. 4) of the PCB 50. In the illustrated example, the upper connectors 70 are socket connectors and the lower connectors 72 are pin connectors.

The upper electrical connectors 70 on each one of the modules 34 are configured to electrically connect with the lower electrical connectors 72 on any other one of the modules 34. This enables the modules 34 to be electrically connected interchangeably with each other in the stacked arrangement of FIG. 1.

Figure 6:
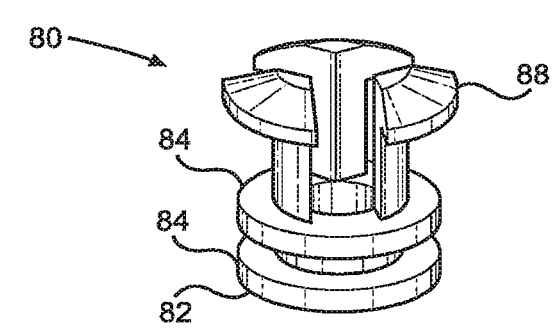
FIG. 6 is a perspective view of another the part shown in FIG. 1.

Attachment pegs 80 are provided to attach the PCBs 50 together in spaced apart (in the tire radial direction) position in the stack. As shown in FIG. 6, each attachment peg 80 has a lower end portion 82 with a pair of flanges 84. The lower end portion 82 is configured to slide inward through the open end 66 of any one of the slots 62. The edges of the PCB 50 alongside the slot 62 are then received between the flanges 84.

Figure 7:
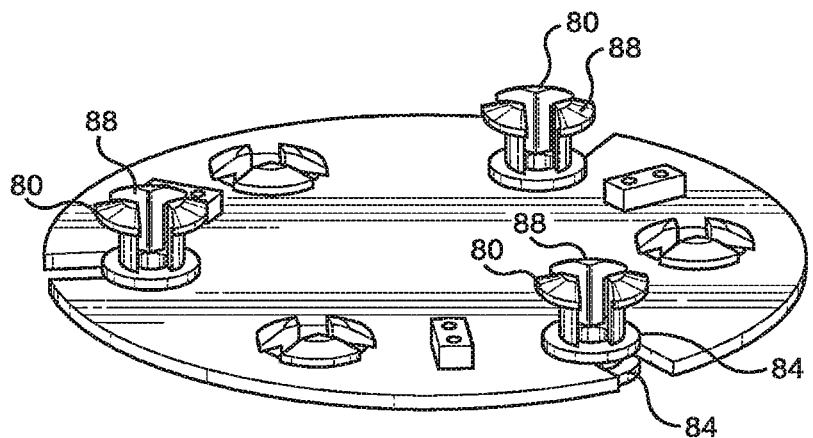
FIG. 7 is a perspective view of interconnected parts of the electronic assembly of FIG. 1.
Figure 8:
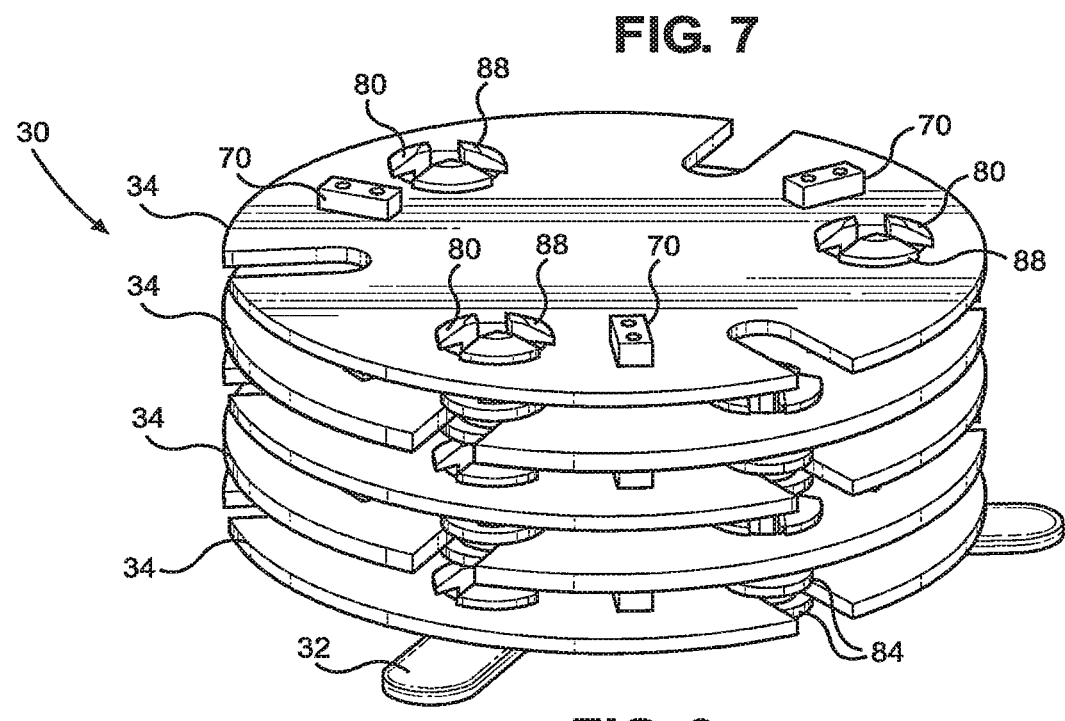
FIG. 8 also is a perspective view of interconnected parts of the electronic assembly of FIG. 1.

Each attachment peg 80 further has an upper end portion 88. The upper end portion 88 is segmented to snap through any one of the apertures 60. When attachment pegs 80 have been inserted in the slots 62 in one of the PCBs 50, as shown in FIG. 7, another of the PCBs 50 can be moved downward to snap the upper end portions 88 of the attachment pegs 80 through the respective apertures 60. Any desired number of the PCBs 50 can thus be attached together in stacked positions that are spaced apart by the attachment pages 80 as shown in FIG. 8.

Additionally, the upper and lower electrical connectors 70 and 72 on each PCB 50 are circumferentially offset from each other such that the upper connectors 72 on an underlying PCB 50 are aligned with the lower connectors on an overlying PCB 50 when the pegs 80 are installed in the slots 62 and apertures 60. The lower connectors 72 on an overlying PCB 50 are moved downward into connected engagement with the upper connectors 70 on an underlying PCB 50 when the overlying PCB 50 is snapped downward onto the upper end portions 88 of the attachment pegs 80.

As further shown in FIG. 5, the base 32 has a housing 100 containing the electrical device 40. The housing 100 has three legs 102 projecting radially outward from a central portion 104. The three legs 102 have a corresponding array of attachment pegs 110 with segmented upper end portions 112. Each upper end portion 112 of an attachment peg 110 on the base 32 is configured to snap through any one of the apertures 60 in the PCBs 50. This enables the base 32 to support the stack of modules 34 as shown in FIG. 8, with any one of the modules 34 as the lowermost module 34 in the stack. The base 32 in the illustrated example is installed between the innerliner 22 (FIG. 1) and a layer 120 adhered over the innerliner 22, with the attachment pegs 110 projecting through the layer 120.

This written description sets for the best mode of carrying out the invention and describes the invention so as to enable a person of ordinary skill in the art to make and use the invention, by presenting examples of the elements recited in the claims. The detailed descriptions of those elements do not impose limitations that are not recited in the claims.

What is claimed is:

1. An apparatus for use with a tire, comprising:
   a plurality of printed circuit boards, each of which includes an electronic device; and
   a plurality of attachment pegs attaching the printed circuit boards together in stacked positions that are spaced apart by the attachment pegs, wherein each attachment peg has a lower end portion configured to attach to any one of the printed circuit boards, and further has an upper end portion configured to attach to any one of the printed circuit boards,
   wherein each printed circuit board includes a plurality of apertures and a plurality of peripheral slots with an open end, the lower end portion of each attachment peg is receivable through the open end of any one of the slots, and the upper end portion of each attachment peg is receivable through any one of the apertures.

2. An apparatus as defined in claim 1, wherein the printed circuit boards are attachable interchangeably between the stacked positions.

3. An apparatus as defined in claim 1, wherein the printed circuit boards are circular, the apertures and slots in each printed circuit board are arranged with each aperture circumferentially offset from a slot, whereby the pegs can attach a pair of printed circuit boards together in adjacent stacked positions that are circumferentially offset from one another.

4. An apparatus as defined in claim 1, further including a base configured for mechanical attachment to the tire, wherein the base includes an attachment peg with an upper end portion configured to attach to any one of the printed circuit boards in a lowermost stacked position, whereby the printed circuit boards are interchangeably attachable to the base in the lowermost stacked position.

5. An apparatus as defined in claim 4, wherein the base includes an electrical device configured as a unique identification device for identifying the tire.

6. An apparatus as defined in claim 1, wherein each printed circuit board has an upper side with an upper electrical contact, and has a lower side with a lower electrical contact, wherein the upper electrical contact on each one of the printed circuit boards is configured to electrically connect with the lower electrical contact on any other one of the printed circuit boards, whereby the printed circuit boards are electrically connectable interchangeably between the stacked positions.

7. An apparatus as defined in claim 1, wherein the electronic devices in the printed circuit boards include air pressure sensors.

8. An apparatus for use with a tire, comprising:
   a plurality of printed circuit boards, each of which includes an electronic device;
   wherein each printed circuit board has an upper side with an upper electrical contact, and has a lower side with a lower electrical contact, wherein the upper electrical contact on each one of the printed circuit boards is electrically connected with the lower electrical contact on any other one of the printed circuit boards;

the printed circuit boards are circular;

the electrical contacts on each printed circuit board are arranged with each upper electrical contact circumferentially offset from a lower electrical contact; and a base configured for mechanical attachment to the tire, wherein the base includes an electrical contact configured to electrically connect with the lower electric contact on any one of the printed circuit boards.

9. An apparatus as defined in claim 8, wherein each one of the printed circuit boards includes circuitry configured to electrically connect the lower electrical contact on any other one of the printed circuit boards in series with the electrical contact on the base.

10. An apparatus as defined in claim 8, wherein the base includes an electrical device configured as a unique identification device for identifying the tire.

11. An apparatus for use with a tire, comprising:

a plurality of printed circuit boards, each of which includes an electronic device; and a plurality of attachment pegs attaching the printed circuit boards together in stacked positions that are spaced apart by the attachment pegs, wherein each attachment peg has a lower end portion configured to attach to any one of the printed circuit boards, and further has an upper end portion configured to attach to any one of the printed circuit boards, whereby the printed circuit boards are attachable interchangeably between the stacked positions;

wherein each printed circuit board has an upper side with an upper electrical contact, and has a lower side with a lower electrical contact, wherein the upper electrical contact on each one of the printed circuit boards is electrically connected with the lower electrical contact on any other one of the printed circuit boards;

the printed circuit boards are circular; and the electrical contacts on each printed circuit board are arranged with each upper electrical contact circumferentially offset from a lower electrical contact.

12. An apparatus as defined in claim 11, further including a base configured for mechanical attachment to the tire, wherein the base includes an electrical contact configured to electrically connect with the lower electrical contact on any one of the printed circuit boards.

13. An apparatus as defined in claim 12, wherein each one of the printed circuit boards includes circuitry configured to electrically connect the lower electrical contact on any other one of the printed circuit boards in series with the electrical contact on the base.

14. An apparatus as defined in claim 12, wherein the base includes an electrical device configured as a unique identification device for identifying the tire.

15. An apparatus as defined in claim 11, wherein the electronic devices in the printed circuit boards include air pressure sensors.

* * * * *